(12) United States Patent  (10) Patent No.: US 8,201,650 B2
Yoshida  (45) Date of Patent: Jun. 19, 2012

(54) DRIVE DEVICE FOR HYBRID VEHICLE

(75) Inventor: Tadafumi Yoshida, Nisshin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1087 days.

(21) Appl. No.: 12/091,935

(22) PCT Filed: Oct. 26, 2006

(86) PCT No.: PCT/JP2006/321932
§ 371 (c)(1),
(2), (4) Date: Apr. 28, 2008

(87) PCT Pub. No.: WO2007/049808
PCT Pub. Date: May 3, 2007

(65) Prior Publication Data
US 2009/0250275 A1    Oct. 8, 2009

(30) Foreign Application Priority Data

Oct. 28, 2005 (JP) ................................. 2005-314752

(51) Int. Cl.
*H02P 1/54* (2006.01)
(52) U.S. Cl. ..................... 180/65.22; 903/952
(58) Field of Classification Search ............... 180/65.21, 180/65.3, 65.4, 65.6, 65.8; 903/951; 318/34
See application file for complete search history.

(56) References Cited

U.S. PATENT DOCUMENTS

| 5,865,263 | A | | 2/1999 | Yamaguchi et al. | |
|---|---|---|---|---|---|
| 6,166,498 | A | * | 12/2000 | Yamaguchi et al. | ............. 318/34 |
| 7,059,443 | B2 | * | 6/2006 | Kira | ............... 180/243 |
| 7,764,051 | B2 | * | 7/2010 | Ishikawa et al. | ................. 322/29 |
| 7,786,640 | B2 | * | 8/2010 | Sada et al. | ..................... 310/112 |
| 7,896,116 | B2 | * | 3/2011 | Tatematsu et al. | ........... 180/65.6 |
| 7,963,353 | B2 | * | 6/2011 | Tatematsu et al. | ......... 180/65.22 |
| 7,977,830 | B2 | * | 7/2011 | Yoshida et al. | .................. 310/54 |
| 2004/0226761 | A1 | | 11/2004 | Takenaka et al. | |
| 2005/0211490 | A1 | | 9/2005 | Shimizu et al. | |
| 2009/0250271 | A1 | * | 10/2009 | Komatsu et al. | ............. 180/65.6 |

FOREIGN PATENT DOCUMENTS

| DE | 4109379 A1 | 10/1991 |
|---|---|---|
| EP | 1 433 643 A2 | 6/2004 |
| JP | 8-149753 A | 6/1996 |
| JP | 2000-217205 A | 8/2000 |
| JP | 2001-119898 A | 4/2001 |
| JP | 2001-119961 A | 4/2001 |
| JP | 2001-187535 A | 7/2001 |
| JP | 2001-322439 A | 11/2001 |
| JP | 2004-343845 A | 12/2004 |
| JP | 2005-032830 A | 2/2005 |
| JP | 2005-253167 A | 9/2005 |
| RU | 2106206 C1 | 3/1998 |

* cited by examiner

*Primary Examiner* — J. Allen Shriver, II
*Assistant Examiner* — James Triggs
(74) *Attorney, Agent, or Firm* — Sughrue Mion, PLLC

(57) ABSTRACT

A casing for integrally accommodating a motor generator and an inverter includes an accommodating portion forming an inverter accommodating space, and an accommodating portion forming a motor accommodating space. The casing has a structure wherein the accommodating portions are integrally formed. Thereby, a drive device for a hybrid vehicle having the inverter and the motor generator accommodated in an integrated fashion prevents external leakage of electromagnetic noises of the inverter from the drive device.

7 Claims, 11 Drawing Sheets

DRIVE DEVICE FOR HYBRID VEHICLE

CROSS REFERENCE TO RELATED APPLICATIONS

This application is a National Stage of International Application No. PCT/JP2006/321932 filed Oct. 26, 2006, claiming priority based on Japanese Patent Application No. 2005-314752 filed Oct. 28, 2005, the contents of all of which are incorporated herein by reference in their entirety.

TECHNICAL FIELD

The invention relates to a drive device for a hybrid vehicle, and particularly to a drive device employed in a hybrid vehicle and having an inverter and a motor accommodated in one casing.

BACKGROUND ART

In many of present hybrid vehicles, an inverter has a large box-shaped casing fixed to a chassis, and a motor casing (transaxle) is arranged under the casing. When consideration is given to the drive device for a hybrid vehicle that can be mounted in as many types of vehicles as possible, it is difficult for the configuration having two casing to standardize parts of the device, since optimum arrangement of these casings is performed for each type of the vehicle.

In principle, it is desired that the units to be combined for operation are accommodated in one casing and are integrated with each other. Japanese Patent Laying-Open No. 2004-343845 (which will be referred to as the "Patent Document 1" hereinafter) has disclosed a drive device for a hybrid vehicle having a motor and an inverter integrated with each other. In the Patent Document 1, a structure includes a drive device casing formed of a plurality of casing portions that are coupled together and accommodate electric motors, respectively, and a plurality of inverters corresponding to the respective electric motors. In this structure, the plurality of inverters are collectively arranged in one of the above casing portions, and fluid passages for cooling the inverters are formed between the casing portion provided with the inverters and the respective inverters. The above structure can integrate the inverters corresponding to the respective electric motors with the drive device and further can achieve inverter cooling.

However, in the drive device casing disclosed in Japanese Patent Laying-Open No. 2004-343845 (Patent Document 1), the casing portions accommodating the respective motors are coupled to the casing portion accommodating the inverter. Therefore, in the structure of the drive device for the hybrid vehicle disclosed in the Patent Document 1, electromagnetic noises caused by a switching operation of a power element in the inverter are liable to leak through a coupling portion where the above casing portions are coupled together. Therefore, countermeasures must be taken to prevent leakage of the electromagnetic noises through the coupling portion where the casing portion of the inverter is coupled to the other portions. If the countermeasures are insufficient, leaked electromagnetic noises may adversely affect other equipment on the vehicle.

Since the inverter is simply arranged on the motor in the above structure, the structure is susceptible to improvement in connection with a vertical position of a center of gravity of the vehicle carrying the drive device. Further, sufficient consideration is not given to reduction in space required in the hybrid vehicle for arranging the drive device. For allowing mounting of the drive device on many kinds of vehicles, it is desired that the inverters and the motors are arranged in a contour substantially equal to that of an automatic transmission that neighbors to an engine in an ordinary vehicle.

DISCLOSURE OF THE INVENTION

The invention has been made for overcoming the above problems, and an object of the invention is to prevent external leakage of electromagnetic noises from a drive device for a hybrid vehicle having an integrated inverter.

A drive device for a hybrid vehicle according to the invention includes a power transmitting mechanism, a power control unit, a casing, a cover member and a fixing member. The power transmitting mechanism combines a power generated by a rotational electric machine with a power generated by an internal combustion engine and providing the combined powers to a drive shaft. The power control unit controls the rotational electric machine. The casing has a first accommodating portion employed for accommodating the power control unit, and a second accommodating unit employed for accommodating at least the rotational electric machine and formed integrally with the first accommodating portion. The cover member is fixed to the casing and covering an opening in the first accommodating portion.

According to the above drive device for the hybrid vehicle, since the casing portions (the first and second accommodating portions) for the power control unit and the rotational electric machine are integrally formed, a mating surface (a coupling portion) is not formed between the casing portions. Therefore, the structure can suppress external leakage of the electromagnetic noises generated by the power control unit from the casing. Accordingly, it is possible to reduce a cost required for countermeasures against leakage of the electromagnetic noises and to prevent external leakage of the electromagnetic noises from the drive device.

Preferably, the drive device for the hybrid vehicle according to the invention further includes a damper coupled to a crankshaft of the internal combustion engine. The rotational electric machine has a rotation axis matching with a rotation axis of the damper. Further, the second accommodating portion is configured to accommodate the rotational electric machine, the damper and the power transmitting mechanism. In a view obtained by projection in a direction perpendicular to a direction of the rotation axis and perpendicular to a vertical direction in a vehicle-mounted state, the first accommodating portion is arranged such that the power control unit is located within a horizontal size, in the vehicle-mounted state, of the second accommodating portion.

In the above drive device for the hybrid vehicle, the horizontal size of the drive device can be kept small so that a volume or sizes of the drive device can be small, and vehicle-mountability can be improved.

Preferably, in the drive device for the hybrid vehicle according to the invention, the power control unit further includes a circuit board that carries a power element of an inverter arranged corresponding to the rotational electric machine and is arranged above the rotational electric machine in a vehicle-mounted state.

According to the above drive device for the hybrid vehicle, the first accommodating unit accommodates the circuit board that carries the power element generating electromagnetic noises, and thereby achieves the structure that can effectively prevent external leakage of the electromagnetic noises from the casings.

Preferably, in the drive device for the hybrid vehicle according to the invention, the power control unit includes an inverter arranged corresponding to the rotational electric machine, and a voltage converter configured to generate an input voltage of the inverter. The voltage converter includes a reactor arranged on one side of a rotation axis of the rotational electric machine, and a capacitor arranged on the other side of the rotation axis of the rotational electric machine.

According to the above drive device for the hybrid vehicle, the capacitor and the reactor, which are components of the voltage converter, can be arranged using spaced on one and the other sides of the rotational electric machine, respectively. Therefore, the required space and therefore the sizes of the drive device can be reduced, and a weight balance with respect to the rotational electric machine can be improved.

In the above structure, the power control unit further includes a circuit board having at least a portion arranged in a region between the reactor and the capacitor, and carrying a power element of the inverter and the voltage converter.

According to the above drive device for the hybrid vehicle, the circuit board can be arranged not to overlap the reactor and the capacitor when viewed in the vertical direction in the vehicle-mounted state. Therefore, it is possible to prevent increase in size in the vehicle height direction of the drive device that may be caused by the arrangement of the circuit board. Thereby, a center of the vehicle can be low, and drive stability can be improved.

Preferably, the drive device for the hybrid vehicle according to the invention further includes a damper coupled to a crankshaft of the internal combustion engine. The rotational electric machine has a rotation axis matching with a rotation axis of the damper. Further, in a view obtained by projection in a direction of the rotation axis, the power control unit is arranged in the casing such that the power control unit is located within a horizontal size, in a vehicle-mounted state, of a projected portion of a portion accommodating the damper, the rotational electric machine and the power transmitting mechanism.

According to the above drive device for the hybrid vehicle, the size thereof in the front-back direction of the vehicle can be reduced, and the drive device can be compact.

Preferably, the drive device for the hybrid vehicle according to the invention further includes a damper coupled to a crankshaft of the internal combustion engine. The rotational electric machine has a rotation axis matching with a rotation axis of the damper. Further, in a view obtained by projection in a direction of the rotation axis, the power control unit is arranged in the casing such that the power control unit is located within a vertical size, in a vehicle-mounted state, of a portion accommodating the damper, the rotational electric machine and the power transmitting mechanism.

According to the above drive device for the hybrid vehicle, the size thereof in the vertical direction of the vehicle can be reduced, and the drive device can be compact. Consequently, the center of the vehicle can be low, and the drive stability can be improved.

Accordingly, the hybrid vehicle drive device of the reduced sizes having the integrated inverter can prevent external leakage of electromagnetic noises of the inverter from the drive device.

BEST MODES FOR CARRYING OUT THE INVENTION

Embodiments of the invention will now be described with reference to the drawings. In the following description and drawings, the corresponding portions bear the same reference numbers, and description thereof is not repeated.

[Description of Components of Vehicle]

Figure 1:
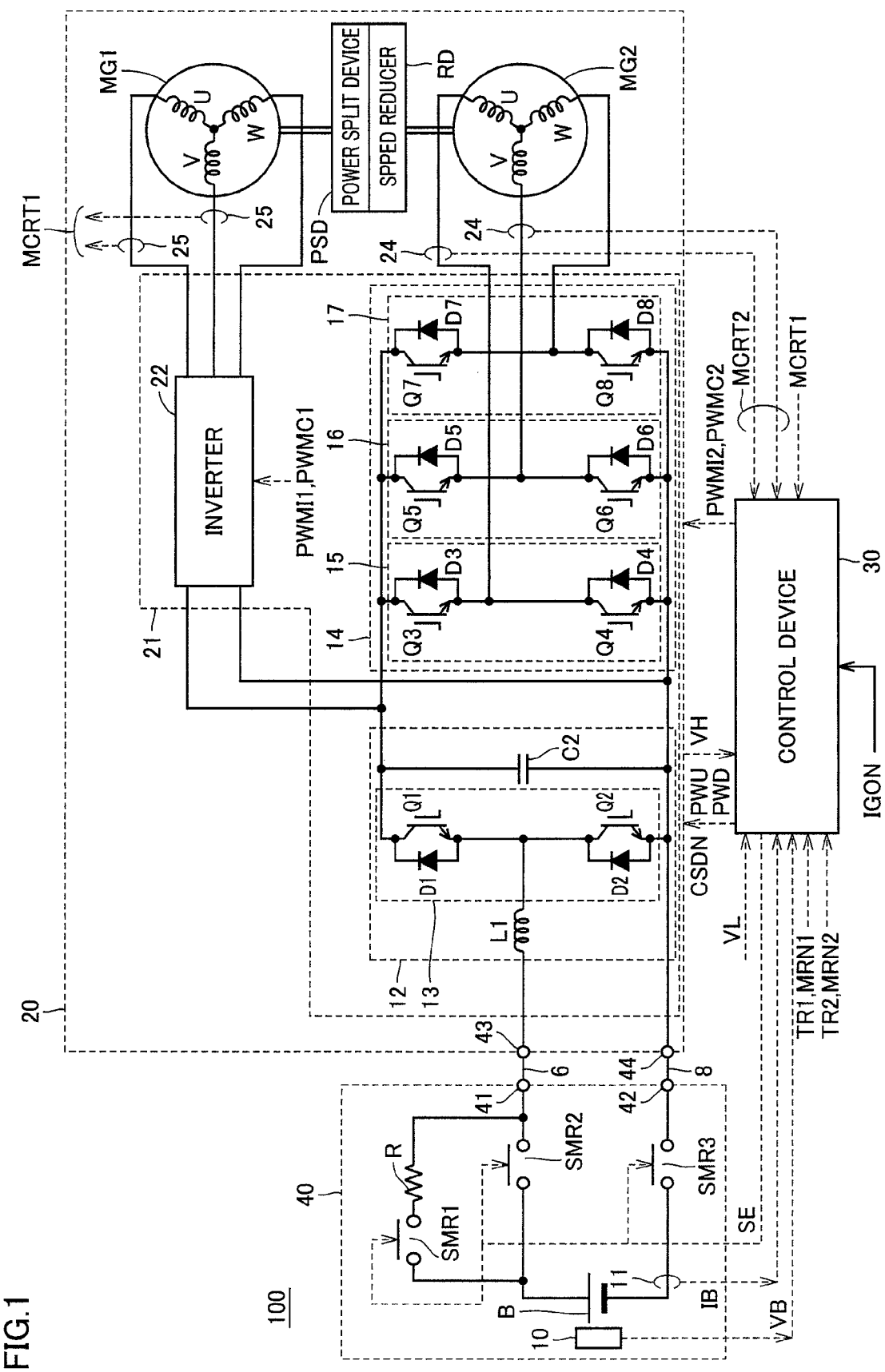
FIG. 1 is a circuit diagram showing a structure relating to a motor generator control of a hybrid vehicle according to an embodiment of the invention.

FIG. 1 is a circuit diagram showing a structure relating to motor generator control of a hybrid vehicle 100 according to an embodiment of the invention.

Referring to FIG. 1, vehicle 100 includes a battery unit 40, a drive device 20 and a control device 30 as well as an engine and wheels which are not shown in FIG. 1.

Drive device 20 includes motor generators MG1 and MG2, a power split device PSD, a reducer RD and a power control unit 21 controlling motor generators MG1 and MG2.

Power split device PSD is basically a mechanism coupled to an engine 4 in FIG. 2 to be described later and motor generators MG1 and MG2 for distributing a motive power among them. For example, the power split device is formed of a planetary gear mechanism having three rotation axes, i.e., a sun gear, a planetary carrier and a ring gear.

Two of the rotation axes of power split device PSD are connected to the rotation axes of engine 4 and motor generator MG1, respectively, and the other one rotation axis is connected to reducer RD. Reducer RD which is integrated with power split device PSD reduces the speed of the rotation of motor generator MG2, and transmits it to power split device PSD.

The rotation axis of the reducer is coupled to the wheels via a reduction gear and a differential gear (both not shown) as will be described later.

Battery unit 40 has terminals 41 and 42. Drive device 20 has terminals 43 and 44. Vehicle 100 further includes a power cable 6 connecting terminals 41 and 43 together as well as a power cable 8 connecting terminals 42 and 44 together.

Battery unit 40 includes a battery B, a system main relay SMR3 connected between an negative pole of battery B and a terminal 42, and a system main relay SMR2 connected between a positive pole of battery B and a terminal 41 as well as a system main relay SMR1 and a limiting resistance R that are connected in series between the positive pole of battery B and terminal 41. System main relays SMR1-SMR3 are turned on/off under control of a control signal SE provided from control device 30.

Battery unit 40 further includes a voltage sensor 10 measuring a voltage VB between the terminals of battery B, and a current sensor 11 sensing a current IB flowing to battery B.

Battery B may be a secondary battery such as a nickel hydrogen battery or a lithium ion battery or a fuel battery. Battery B may be replaced with an electric double layer capacitor of a large capacitance.

Power control unit 21 includes inverters 22 and 14 arranged corresponding to motor generators MG1 and MG2, respectively, and a booster converter 12 arranged commonly to inverters 22 and 14.

Booster converter 12 boosts a voltage between terminals 43 and 44. Inverter 14 converts a DC voltage provided from booster converter 12 into a three-phase AC, and provides it to motor generator MG2.

Booster converter 12 includes a reactor L1 having one end connected to terminal 43, IGBT elements Q1 and Q2 connected in series between output terminals of booster converter 12 providing a boosted voltage VH, diodes D1 and D2 connected in parallel to IGBT elements Q1 and Q2, respectively, and a smoothing capacitor C2. Smoothing capacitor C2 smoothes the voltage boosted by booster converter 12. In this embodiment, the IGBT element is described as a representative example of a power semiconductor switching element (which may also be referred to as a "power element" hereinafter) for electric power conversion. Thus, the IGBT element may be replaced with another power element.

The other end of reactor L1 is connected to an emitter of IGBT element Q1 and a collector of IGBT element Q2. A cathode of diode D1 is connected to a collector of IGBT element Q1, and an anode of diode D1 is connected to the emitter of IGBT element Q1. A cathode of diode D2 is connected to the collector of IGBT element Q2. An anode of diode D2 is connected to an emitter of IGBT element Q2.

Inverter 14 converts the DC voltage provided from booster converter 12 into a three-phase AC, and provides it to motor generator MG2 driving the wheels. Inverter 14 returns the power that is generated by motor generator MG2 according to regenerative braking to booster converter 12. In this operation, control device 30 controls booster converter 12 to operate as a step-down circuit.

Inverter 14 includes U-, V- and W-phase arms 15, 16 and 17, which are connected in parallel between booster converter 12 and the output line.

U-phase arm 15 includes IGBT elements Q3 and Q4 connected in series, and diodes D3 and D4 connected in parallel to IGBT elements Q3 and Q4, respectively. A cathode of diode D3 is connected to a collector of IGBT element Q3, and an anode of diode D3 is connected to an emitter of IGBT element Q3. A cathode of diode D4 is connected to a collector of IGBT element Q4, and an anode of diode D4 is connected to an emitter of IGBT element Q4.

V-phase arm 16 includes IGBT elements Q5 and Q6 connected in series, and diodes D5 and D6 connected in parallel to IGBT elements Q5 and Q6, respectively. A cathode of diode D5 is connected to a collector of IGBT element Q5, and an anode of diode D5 is connected to an emitter of IGBT element Q5. A cathode of diode D6 is connected to a collector of IGBT element Q6, and an anode of diode D6 is connected to an emitter of IGBT element Q6.

W-phase arm 17 includes IGBT elements Q7 and Q8 connected in series, and diodes D7 and D8 connected in parallel to IGBT elements Q7 and Q8, respectively. A cathode of diode D7 is connected to a collector of IGBT element Q7, and an anode of diode D7 is connected to an emitter of IGBT element Q7. A cathode of diode D8 is connected to a collector of IGBT element Q8, and an anode of diode D8 is connected to an emitter of IGBT element Q8.

Intermediate points of these arms are connected to the phase ends of the respective phase coils of motor generator MG2. More specifically, motor generator MG2 is a three-phase permanent magnet synchronous motor, and each of the three, i.e., U-, V- and W-phase coils has one end connected to the neutral point. The other end of the U-phase coil is connected to a connection node between IGBT elements Q3 and Q4. The other end of the V-phase coil is connected to a connection node between IGBT elements Q5 and Q6. The other end of the W-phase coil is connected to a connection node between IGBT elements Q7 and Q8.

A current sensor 24 senses the current flowing through motor generator MG2, and provides the sensed current value, i.e., a motor current value MCRT2 to control device 30.

Inverter 22 is arranged parallel to inverter 14, and is connected to booster converter 12. Inverter 22 converts the DC voltage provided from booster converter 12, and provides it to motor generator MG1. Inverter 22 receives the voltage boosted by booster converter 12, and drives motor generator MG1, e.g., for starting the engine.

Also, the power generated by motor generator MG1 that is driven by the rotational torque transmitted from the crankshaft of the engine is returned by inverter 22 to booster converter 12. In this operation, booster converter 12 operates as a step-down circuit under the control of control device 30.

The internal structure of inverter 22 is not shown, but is similar to that of inverter 14 so that detailed description thereof is not repeated.

Control device 30 receives torque instruction values TR1 and TR2 as well as values of motor rotation speeds MRN1 and MRN2, voltages VB, VL and VH, and current IB, and also receives motor current values MCRT1 and MCRT2 as well as an activation signal IGON.

Torque instruction value TR1, motor revolution speed MRN1 and motor current value MCRT1 relate to motor generator MG1, and torque instruction value TR2, motor revolution speed MRN2 and motor current value MCRT2 relate to motor generator MG2.

Voltage VB is a voltage of battery B, and current IB is a current flowing through battery B. Voltage VL is a voltage that is not yet boosted by booster converter 12, and voltage VH is a voltage boosted by booster converter 12.

Control device 30 provides to booster converter 12 a control signal PWU for instructing the boosting, a control signal PWD for instructing the step-down and a signal CSDN for instructing inhibition of the operation.

Further, control device 30 provides to inverter 14 a drive instruction PWM12 for converting the DC voltage provided from booster converter 12 into the AC voltage used for driving motor generator MG2, and a regeneration instruction PWMC2 converting the AC voltage generated by motor generator MG2 into the DC voltage and returning it to booster converter 12 side.

Likewise, control device 30 provides to inverter 22 a drive instruction PWM11 for converting the DC voltage into the AC voltage used for driving motor generator MG1, and a regeneration instruction PWMC1 converting the AC voltage generated by motor generator MG1 into the DC voltage and returning it to booster converter 12 side.

Figure 2:
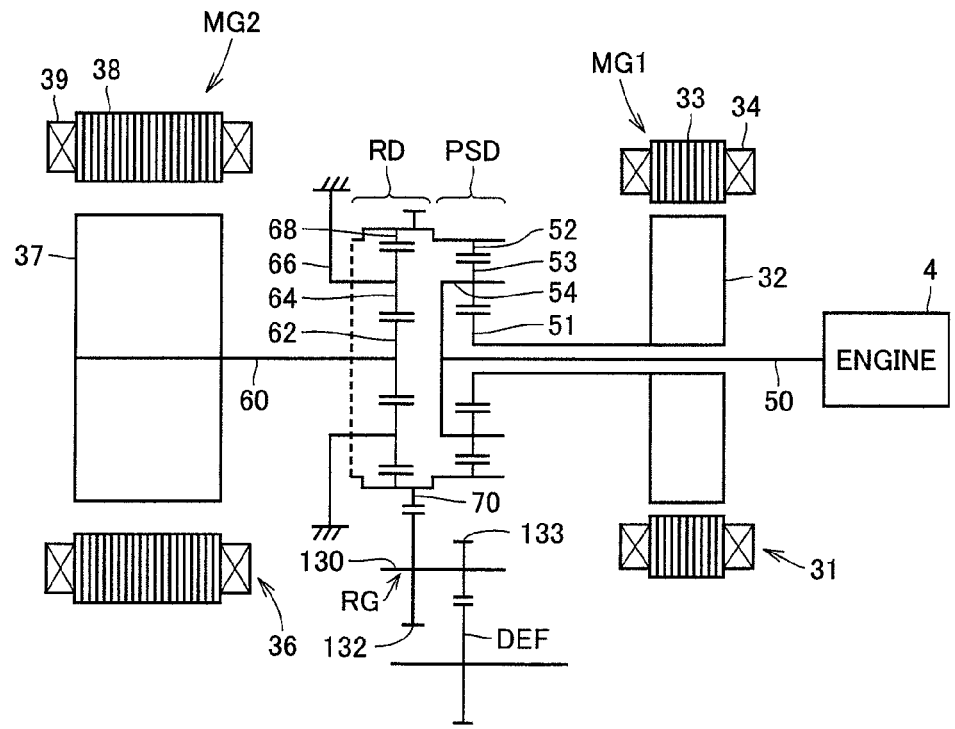
FIG. 2 is a schematic diagram for specifically illustrating a power split device and a reducer in FIG. 1.

FIG. 2 is a schematic diagram for specifically illustrating power split device PSD and reducer RD in FIG. 1.

Referring to FIG. 2, the vehicle drive device includes motor generator MG2, reducer RD connected to the rotation axis of motor generator MG2, the axle that rotates with a rotation axis rotating at a speed reduced by reducer RD, engine 4, motor generator MG1, and power split device PSD distributing the power among reducer RD, engine 4 and motor generator MG1. Reducer RD exhibits a reduction ratio, e.g., of 2 or more when it transmits the power from motor generator MG2 to power split device PSD.

A crankshaft 50 of engine 4 and rotors 32 and 37 of motor generators MG1 and MG2 rotate coaxially with each other.

In the example shown in FIG. 2, power split device PSD is a planetary gear, and includes a sun gear 51 coupled to a hollow sun gear shaft through which crank shaft 50 coaxially extends, a ring gear 52 arranged rotatably and coaxially to crank shaft 50, pinion gears 53 that are arranged between sun gear 51 and ring gear 52, and revolve around sun gear 51 while rotating around their respective axes, and a planetary carrier 54 coupled to an end of crank shaft 50 and carrying the rotation axes of pinion gears 53.

Power split device PSD has three power input/output shafts which are a sun gear shaft coupled to sun gear 51, a ring gear casing coupled to ring gear 52 and crank shaft 50 coupled to planetary carrier 54. When the powers to be transmitted to or from two among these three shafts are determined, the power to be transmitted to or from the other one shaft is determined based on the above powers transmitted to or from the two shafts.

A counter drive gear 70 for taking out the power is arranged outside the ring gear casing for rotation together with ring gear 52. Counter drive gear 70 is connected to power transmission/reduction gear RG for transmitting the power between counter drive gear 70 and power transmission/reduction gear RG. Power transmission/reduction gear RG drives a differential gear DEF. On a downward slope or the like, the rotation of the wheels is transmitted to differential gear DEF, which drives power transmission/reduction gear RG.

Motor generator MG1 includes a stator 31 forming a rotating magnetic field, and a rotor 32 that is arranged inside stator 31 and has a plurality of permanent magnets in an embedded fashion. Stator 31 includes a stator core 33 and a three-phase coil 34 wound around stator core 33. Rotor 32 is coupled to a sun gear shaft rotating together with sun gear 51 of power split device PSD. Stator core 33 is formed of a stack of thin magnetic steel plates, and is fixed to a casing (not shown).

Motor generator MG1 operates as an electric motor that drives rotor 32 to rotate by an interaction between the magnetic field formed by the permanent magnets embedded in rotor 32 and the magnetic field formed by three-phase coil 34. Motor generator MG1 also operates as an electric power generator that produces an electromotive force between the opposite ends of three-phase coil 34 by an interaction between the magnetic field of the permanent magnets and the rotation of rotor 32.

Motor generator MG2 includes a stator 36 forming a rotating magnetic field and rotor 37 that is arranged inside stator 31 and has a plurality of permanent magnets in an embedded fashion. Stator 36 includes a stator core 38 and a three-phase coil 39 wound around stator core 38.

Rotor 37 is coupled by reducer RD to the ring gear casing rotating together with ring gear 52 of power split device PSD. Stator core 38 is formed of a stack of thin magnetic steel plates, and is fixed to a casing (not shown).

Motor generator MG2 operates as an electric power generator producing an electromotive force between the opposite ends of three-phase coil 39 by an interaction between the magnetic field of the permanent magnets and the rotation of rotor 37. Motor generator MG2 also operates as an electric motor driving and rotating rotor 37 by an interaction between the magnetic field formed by the permanent magnets and the magnetic field formed by three-phase coil 39.

Reducer RD performs the speed reduction by the structure in which a planetary carrier 66, i.e., one of the rotary elements of the planetary gear is fixed to the casing of the vehicle drive device. More specifically, speed reducer RD includes a sun gear 62 coupled to the shaft of rotor 37, a ring gear 68 rotating together with ring gear 52 and a pinion gear 64 that meshes with ring gear 68 and sun gear 62 for transmitting the rotation of sun gear 62 to ring gear 68.

For example, the number of teeth of sun gear 62 may be twice or more as large as that of ring gear 68, whereby the reduction ratio can be two or more.

[Brief Description of Component Arrangement and Description of Magnetic Noise Leakage Preventing Structure]

Figure 3:
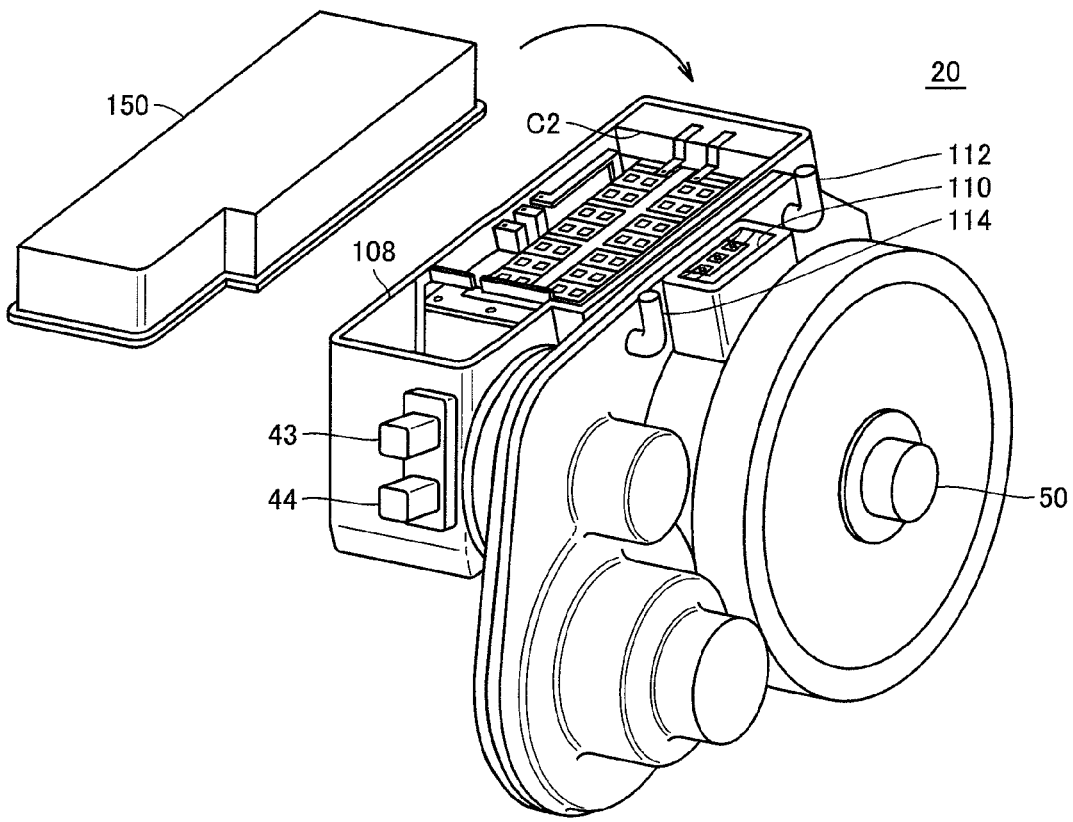
FIG. 3 is a perspective view showing an outer appearance of a drive device for a hybrid vehicle according to the embodiment of the invention.
Figure 4:
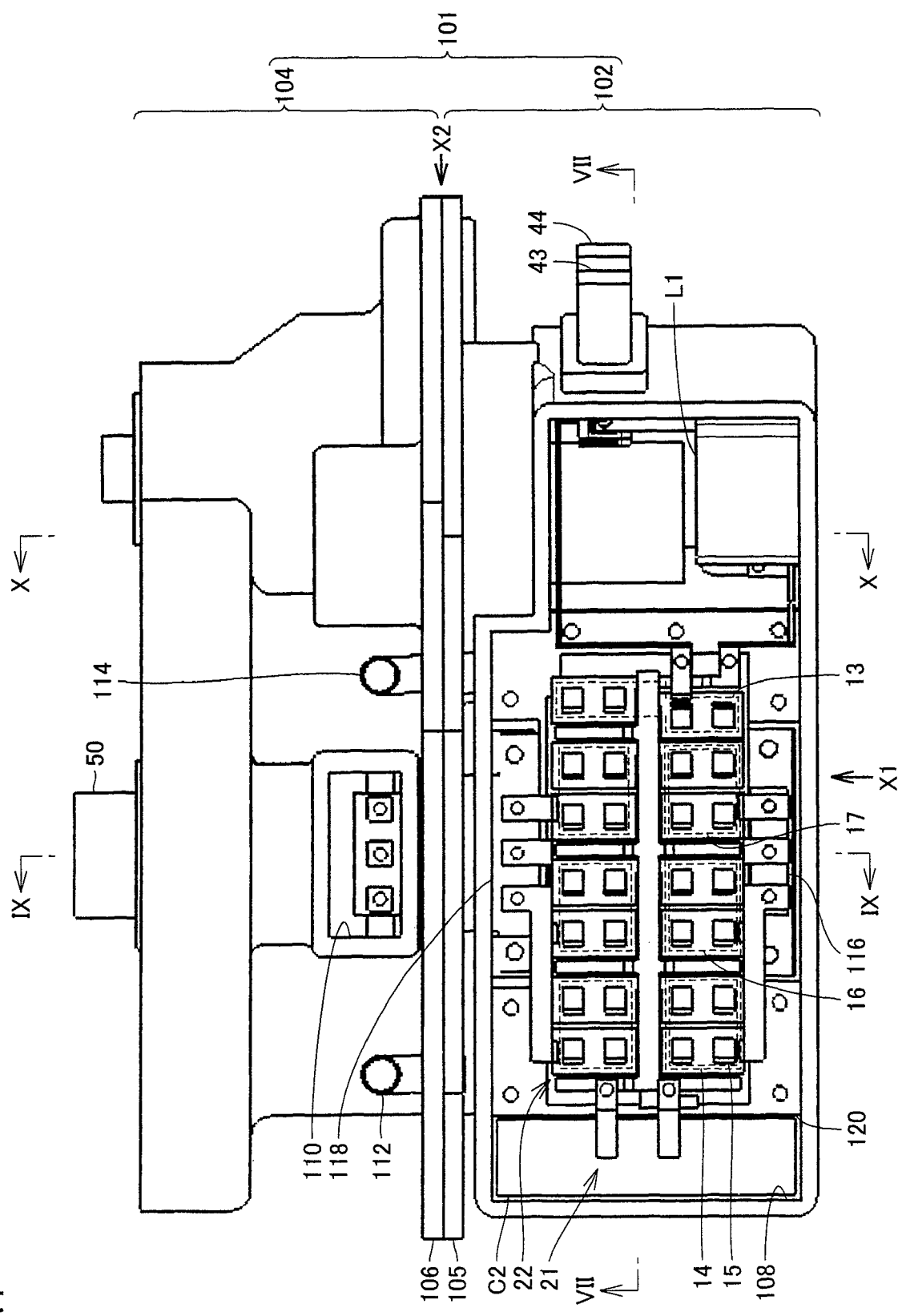
FIG. 4 is a plan of a drive device shown in FIG. 3.

FIG. 3 is a perspective view showing an outer appearance of drive device 20 of the hybrid vehicle according to the embodiment of the invention. FIG. 4 is a plan of drive device 20.

Referring to FIGS. 3 and 4, a casing 101 of drive device 20 can be divided into casings 104 and 102. Casing 104 is primarily used for accommodating motor generator MG1, and casing 102 is primarily used for accommodating motor generator MG2 and the power control unit.

Casings 104 and 102 are provided with flanges 106 and 105, respectively. By fixing flanges 106 and 105 together by bolts or the like, casings 104 and 102 are coupled and integrated together.

Casing 102 is provided with an opening 108 for attaching a power control unit. After the power control unit is attached, opening 108 is closed by a cover 150. Thus, in the completed vehicle, whole drive device 20 is accommodated inside casing 101 and cover 150.

Further, capacitor C2 is accommodated in an inner left portion (on the side of the forward direction of the vehicle) of opening 108, a power element board 120 and terminal bases 116 and 118 are accommodated in the central portion thereof, and reactor L1 is accommodated in the right portion thereof. In the vehicle-mounted state, opening 108 is closed by a lid. Capacitor C2 may be accommodated in the right portion and reactor L1 may be accommodated in the left portion in contrast to the above.

Reactor L1 is arranged on one side of the rotation axis of motor generators MG1 and MG2, and capacitor C2 is arranged on the other side of the rotation axis. Power element board 120 is arranged in a region between capacitor C2 and reactor L1. Motor generator MG2 is arranged under power element board 120.

Power element board 120 carries inverter 22 controlling motor generator MG1, inverter 14 controlling motor generator MG2 and an arm unit 13 of the booster converter.

Power supply bus bars that are stacked vertically are arranged in a region between inverters 14 and 22. The bus bars extend from U-, V- and W-phase arms 15, 16 and 17 of inverter 14 to terminal base 116 connected to the stator coil of motor generator MG2, respectively. Likewise, the three bus bars extend from inverter 22 to terminal base 118 connected to the stator coil of motor generator MG1.

Since power element board 120 is liable to be hot, a water passage is arranged under power element board 120 for cooling it, and casing 102 is provided with cooling water inlet 114 and outlet 112 of the water passage. These inlet and outlet are formed by driving union nuts into casing 102 through flanges 106 and 105.

The voltage supplied from battery unit 40 in FIG. 1 through the power cables to terminals 43 and 44 is boosted by booster converter 12 including reactor L1 and arm unit 13, is smoothed by capacitor C2 and is supplied to inverters 14 and 22.

By using the battery voltage boosted by booster converter 12, it is possible to reduce the battery voltage to about 200 V and further to drive the motor generator with a high voltage exceeding 500 V so that the electric loss can be suppressed owing to the power supply with a small current and, at the same time, a high output of the motor can be achieved.

For additionally integrating booster converter 12 as drive device 20 together with inverters 14 and 22 as well as motor generators MG1 and MG2, consideration must be given to positions of arrangement of reactor L1 and capacitor C2 that are relatively large parts.

The power elements (IGBT elements) arranged on power element board 120 generate electromagnetic noises due to the switching operation for power conversion. Therefore, a structure is required for leaking the electromagnetic noises externally from the casing of drive device 20.

Figure 5A:
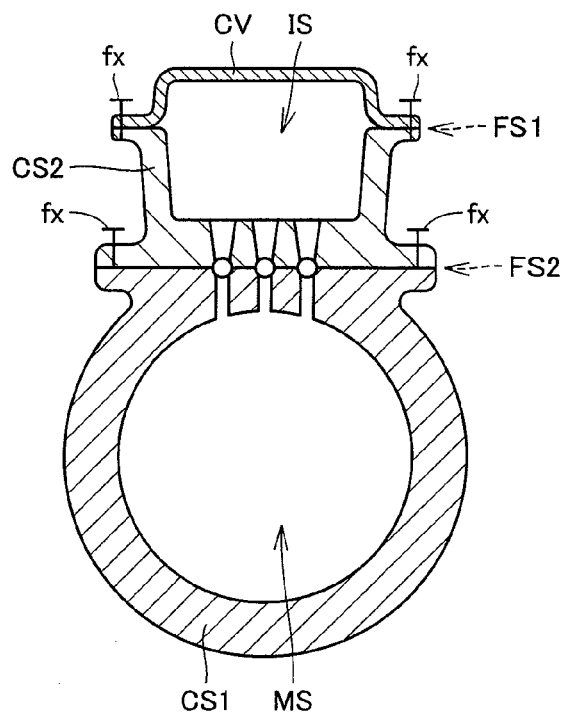
FIG. 5A conceptually illustrates a structure preventing leakage of electromagnetic noises in a drive device shown as a comparative example.
Figure 5B:
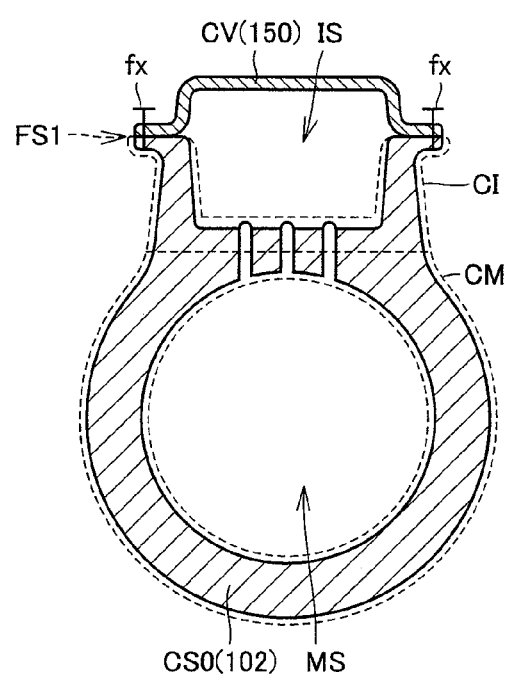
FIG. 5B conceptually illustrates a structure preventing leakage of electromagnetic noises in the drive device according to the embodiment of the invention.

FIG. 5 conceptually illustrates the structure for preventing the leakage of the electromagnetic noises in the drive device according to the embodiment of the invention. FIG. 5A shows a comparative example similar to that disclosed in the foregoing Patent Document 1 and specifically shows an example of the leakage preventing structure for the electromagnetic noises in the hybrid vehicle drive device integrated with the inverter. FIG. 5B shows the structure according to the embodiment of the invention.

Referring to FIG. 5A, the drive device of the comparative example includes a casing member CS1 forming an accommodating space MS for the motor generators and a casing member CS2 forming an accommodating space IS for the power control unit such as inverters, and these casing members CS1 and CS2 are produced independently of each other. As shown in the figure, each of casing members CS1 and CS2 requires an opening for taking out the bus bars or interconnections electrically connecting the inverters and the motor generators together. Fixing members fx couple casing members CS1 and CS2 together so that the drive device including the motor generators is integrated with the inverters.

Casing member CS2 is provided at its upper portion with an opening for attaching the power control unit. This opening is finally closed by a cover member CV coupled to casing member CS2 by fixing members fx. Thereby, the power control unit including the inverters is closed by casing member CS2 and cover member CV with respect to an external space of drive device 20.

In the structure of the comparative example, however, there is a possibility that the electromagnetic noises leak not only through a coupling portion (mating surface) FS1 of casing member CS2 and cover member CV but also through a coupling portion (mating surface) FS2 of casing members CS2 and CS1. Therefore, an appropriate coupling structure for preventing the electromagnetic noises is required for each of mating surfaces FS1 and FS2.

However, in the drive device according to the embodiment of the invention, as can be seen from FIG. 5B, a casing CS0 has a structure in which a motor accommodating portion CM forming accommodating space MS for the motor generators is formed integrally with an inverter accommodating portion CI forming accommodating space IS for the power control unit including the inverters. More specifically, casing CS0 does not have a portion corresponding to mating surface FS2 in FIG. 5A, and has inverter accommodating portion CI and motor accommodating portion CM that are formed continuously to each other. Casing CS0 having the integral structure thus formed is produced by casting of aluminum alloy.

Further, cover member CV is arranged similarly to the structure in FIG. 5A. Therefore, the power control unit including the inverters is isolated from the outside of drive device 20 by casing CS0 having inverter accommodating portion CI and motor accommodating portion CM formed integrally with each other as well as cover member CV.

Therefore, the structure shown in FIG. 5B is different from that shown in FIG. 5A in that the mating surface for coupling the independent casing members together is not present so that it is possible to prevent effectively the external leakage of the electromagnetic noises from the power control unit to the outside of drive device 20. Consequently, it is possible to reduce a cost that is required for countermeasures against the electromagnetic noise leakage, and to prevent the external leakage of the electromagnetic noises from the drive device.

[Detailed Description of Component Arrangement and Structure for Preventing Electromagnetic Noise Leakage]

Detailed description will now be given on the arrangement of the components of drive device 20 in the casing.

Figure 6:
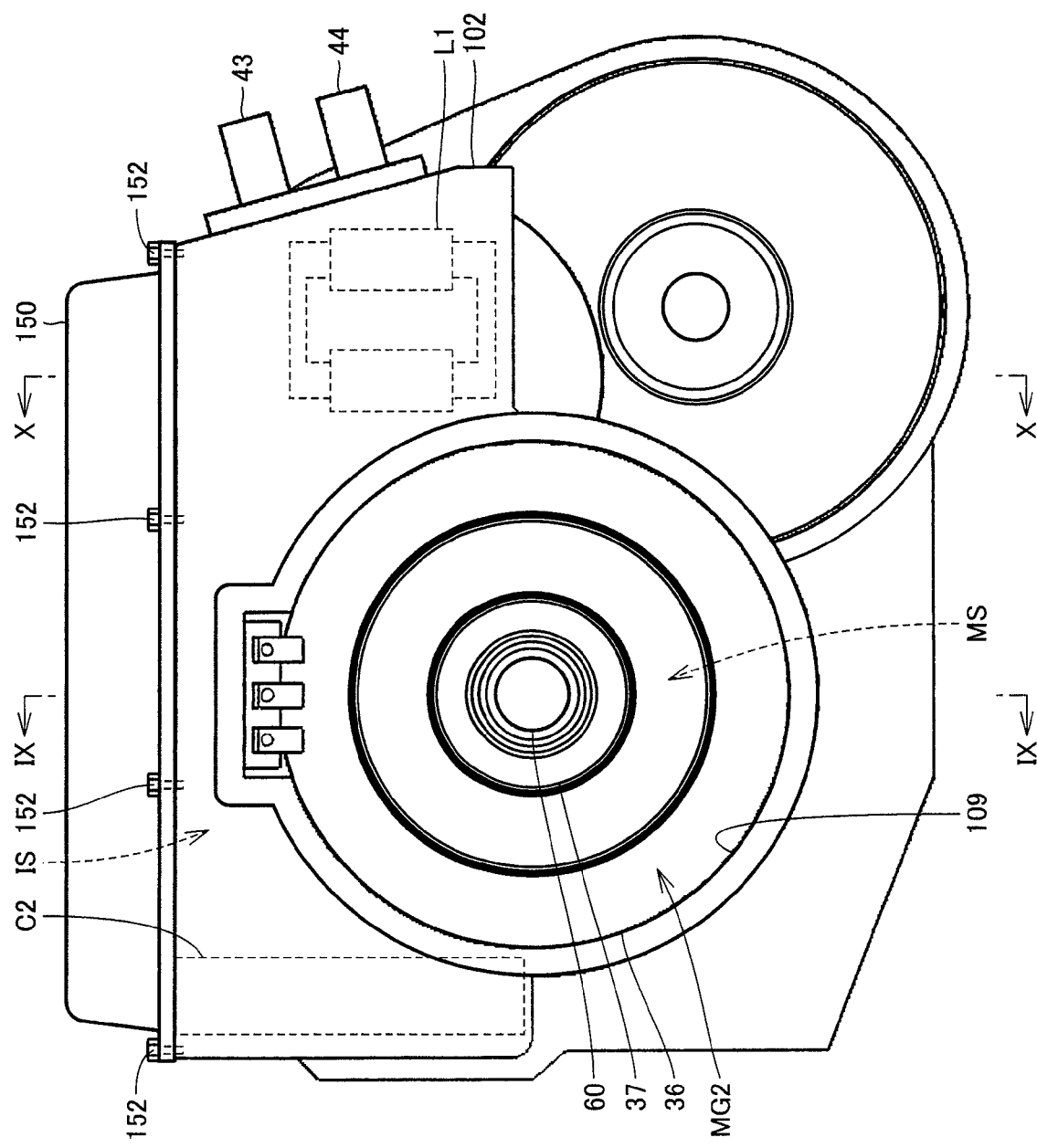
FIG. 6 is a side view of the drive device taken in a direction X1 in FIG. 4.

FIG. 6 is a side view of drive device 20 viewed in a direction X1 in FIG. 4.

Referring to FIG. 6, casing 102 is provided with an opening 109 for attaching the motor generators and for maintenance. In the vehicle-mounted state, opening 109 is closed by a lid (not shown).

Motor generator MG2 is arranged inside opening 109. Rotor 37 is arranged inside stator 36 connected to the U-, V- and W-phase bus bars. A hollow shaft 60 can be viewed at the center of rotor 37.

As shown in FIG. 6, stator 36 of motor generator MG2 protrudes into space IS accommodating power control unit 21 in casing 102 to a large extent. Therefore, reactor L1 and capacitor C2 are arranged on one and the other sides of motor generator MG2, respectively, so that the large parts are efficiently accommodated. This can achieve the compact drive device for the hybrid vehicle.

Further, the opening formed above the accommodating space of power control unit 21 is closed by cover 150 fixed to casing 102 by the fixing members, i.e., bolts 152. As already described with reference to FIG. 5B, casing 102 has the structure in which the accommodating portion defining accommodating space (accommodating chamber) MS of motor generator MG2 is formed integrally with the accommodating portion defining accommodating space (accommodating chamber) IS of power control unit 21. A mating surface between casing 102 that is formed integrally and cover 150 must be configured to prevent leakage of the electromagnetic noises from the inside.

Figure 7:
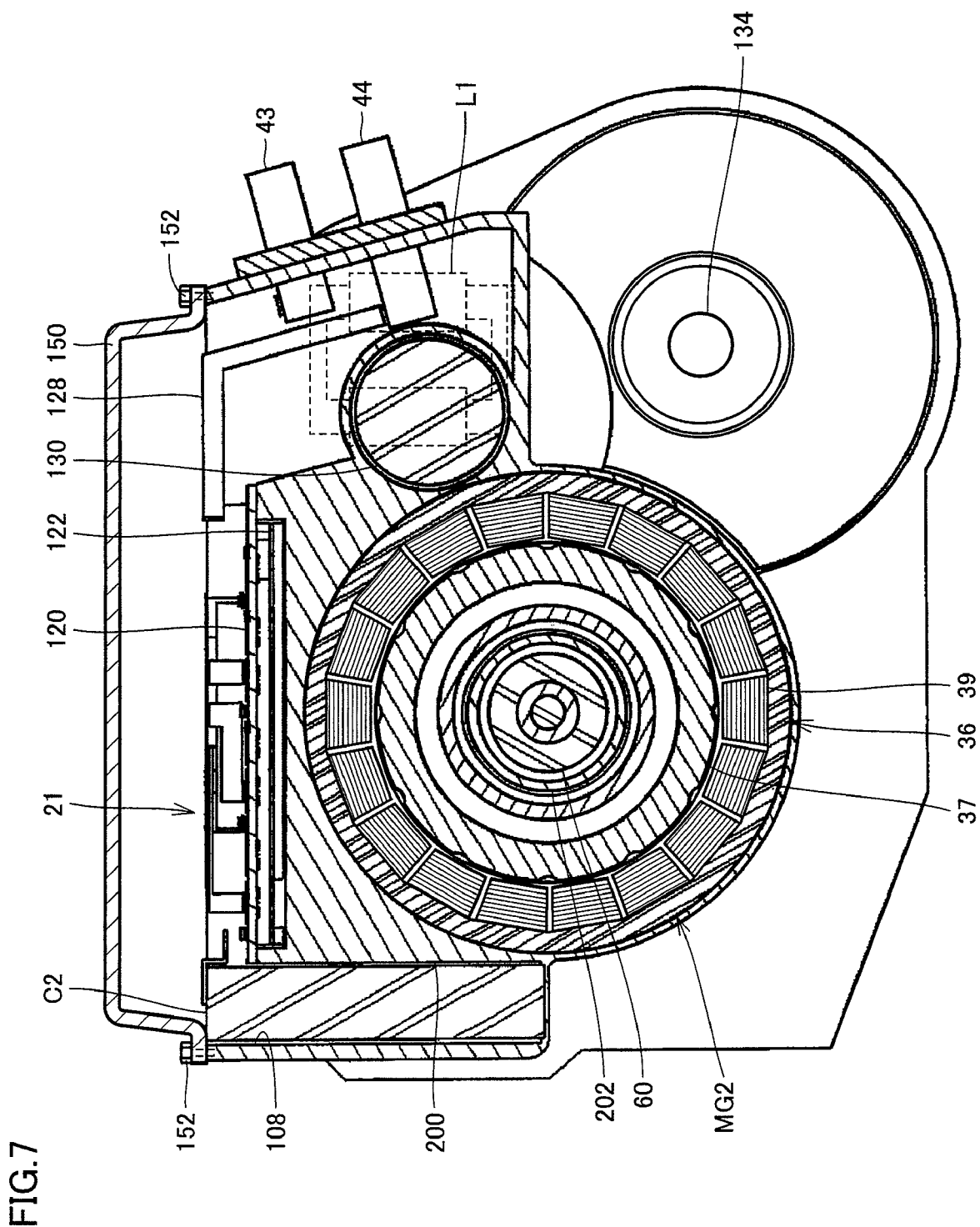
FIG. 7 is a cross section taken along line VII-VII in FIG. 4.

FIG. 7 is a cross section taken along line VII-VII in FIG. 4.

FIG. 7 shows a cross section of motor generator MG2 and a cross section of an accommodating chamber accommodating power control unit 21.

The drive device for the hybrid vehicle includes motor generator MG2, motor generator MG1 arranged behind motor generator MG2 in FIG. 7 and having the rotor coaxial with that of motor generator MG2, the power split device arranged coaxially with the crank shaft and located between motor generators MG1 and MG2, and power control unit 21 controlling motor generators MG1 and MG2. Power control unit 21 has reactor L1 and smoothing capacitor C2 that are arranged in a divided fashion on one and the other sides of the rotation center axis of motor generator MG2, respectively. Motor generators MG1 and MG2, the power split device and power control unit 21 are accommodated in the metal casing in the integrated fashion.

For preventing leakage of a lubricating oil of motor generator MG2 toward power element board 120, casing 102 is provided with a partition 200 between the two spaces. Partition 200 is provided at its top surface with a water passage 122 for cooling power element board 120. Water passage 122 is in communication with cooling water inlet 114 and cooling water outlet 112 already described.

A bus bar 128 transmits a negative power supply potential from terminal 44 to power element board 120. Another bus bar (not shown) transmits the positive power supply potential from terminal 43 to reactor L1.

A portion carrying a rotation shaft 130 of the reduction gear protrudes into the accommodating chamber accommodating this power control unit.

Description will now be given on the cross section of motor generator MG2. A winding portion of coil 39 of stator 36 is visible radially inside the stator, and rotor 37, a casing partition 202 and hollow shaft 60 of the rotor are visible radially inside the winding portion.

Figure 8:
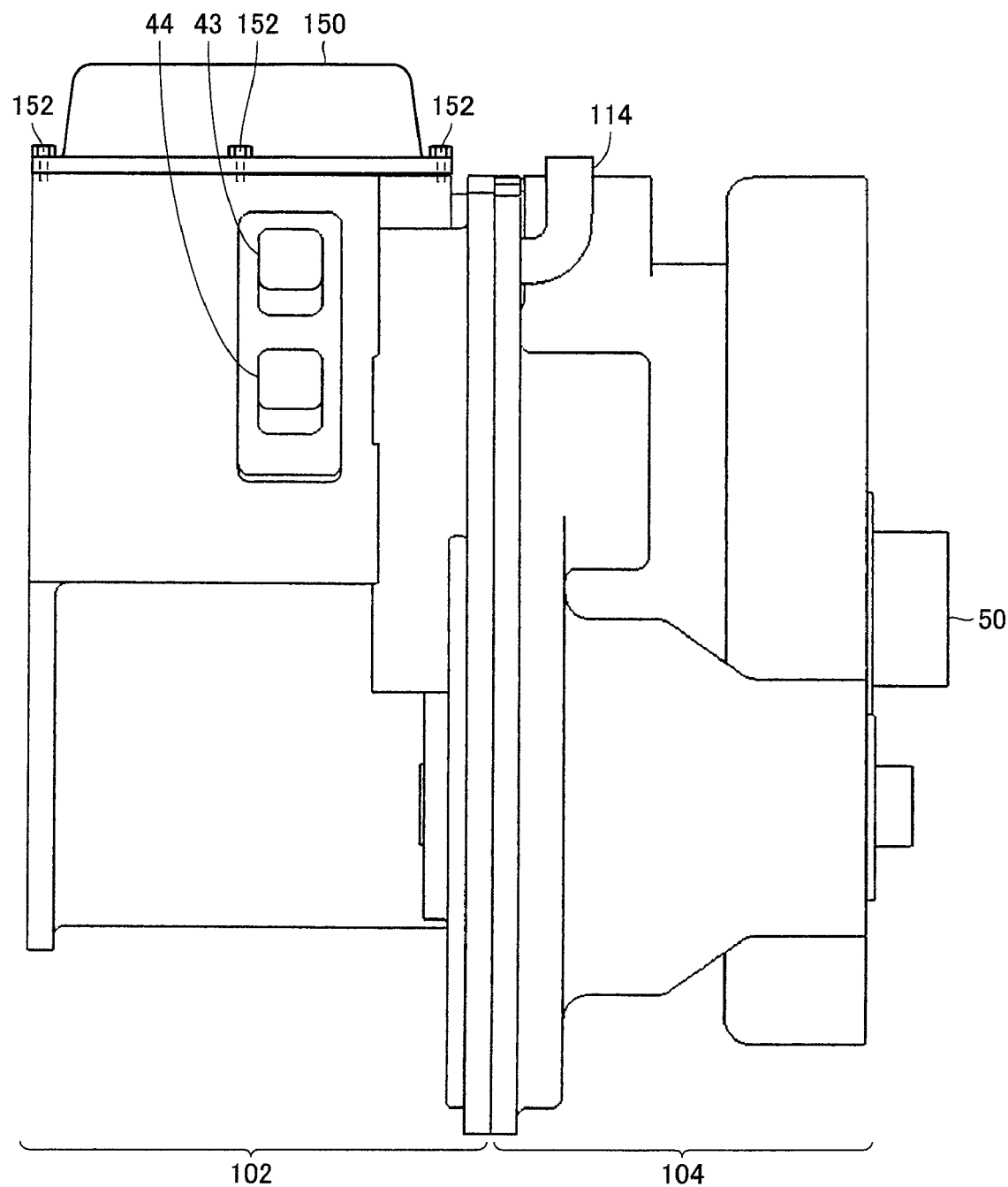
FIG. 8 is a side view of the drive device viewed in a direction X2 in FIG. 4.

FIG. 8 is a side view of drive device 20 viewed in a direction X2 in FIG. 4. In FIG. 7, a control board 121 controlling the power element is arranged above the power element board.

Figure 9:
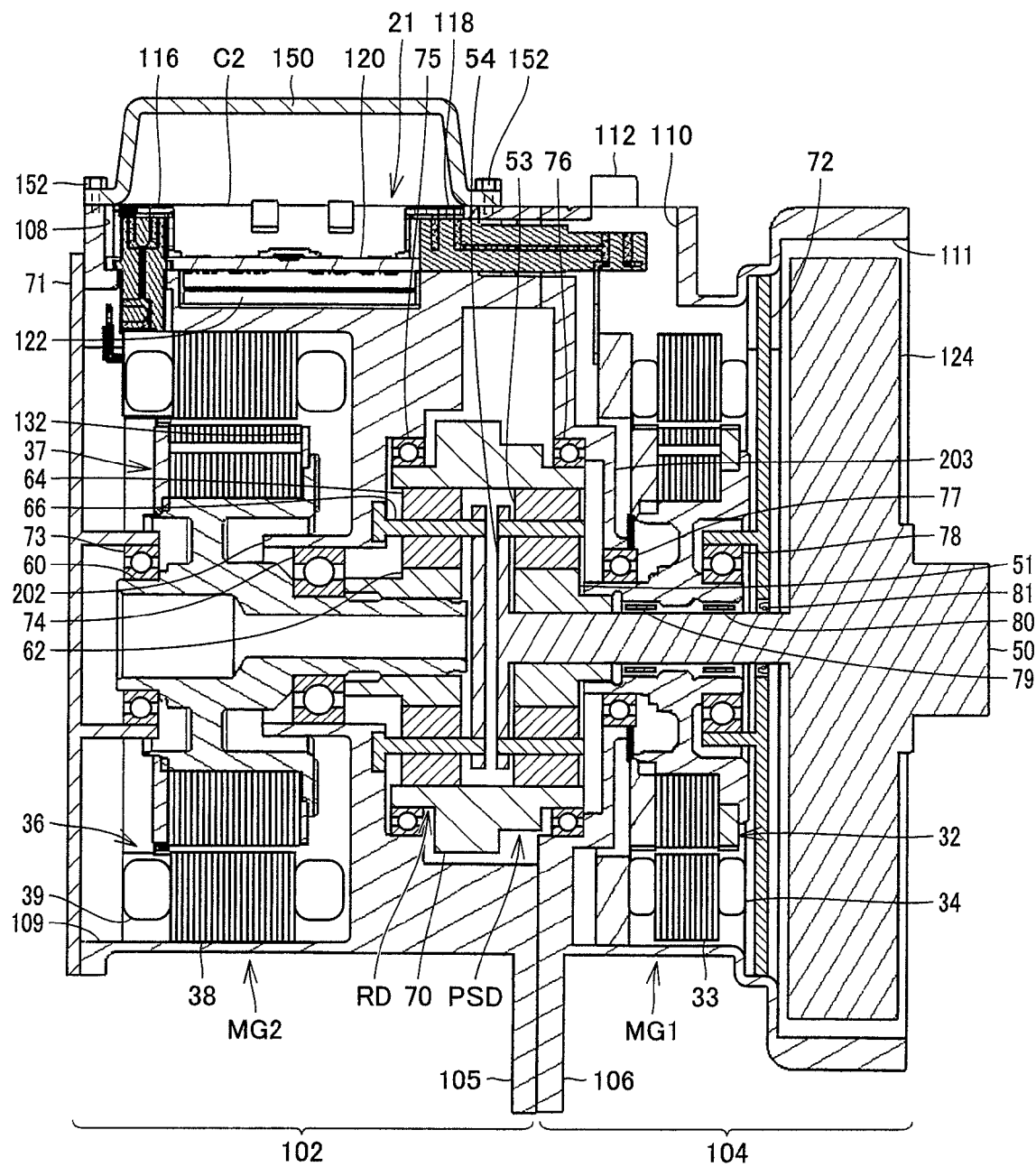
FIG. 9 is a cross section taken along line IX-IX in FIG. 4.

FIG. 9 is a cross section taken along line IX-IX in FIG. 4.

Referring to FIGS. 8 and 9, crankshaft 50 of the engine is connected to a damper 124, of which output shaft is connected to power split device PSD.

Damper 124, motor generator MG1, power split device PSD, reducer RD and motor generator MG2 are coaxially arranged in this order from the side near the engine toward the other side. Rotor 32 of motor generator MG1 has a hollow shaft, through which an output shaft of damper 124 extends.

The shaft of rotor 32 of motor generator MG1 is spline-engaged with sun gear 51 located on the side near power split device PSD. The shaft of damper 124 is coupled to planetary carrier 54, which carries the rotation axes of pinion gears 53 for revolution around the shaft of damper 124. Pinion gears 53 mesh with sun gear 51 and ring gear 52 in FIG. 2 formed on the inner periphery of the ring gear casing.

A portion of rotor shaft 60 of motor generator MG2 near reducer RD is spline-fitted to sun gear 62. Planetary carrier 66 of reducer RD is fixed to partition 202 of casing 102. Planetary carrier 66 carries the rotation shafts of pinion gears 64. Pinion gears 64 mesh with sun gear 62 and ring gear 68 in FIG. 2 formed on the inner periphery of the ring gear casing.

As can be seen from FIG. 9, motor generator MG1 and damper 124 can be attached through an opening 111 on the right in FIG. 9 of casing 104, and motor generator MG2 can be attached through left opening 109 of casing 102. Reducer RD and power split device PSD can be attached through the mating plane of flanges 105 and 106.

Opening 109 of casing 102 is tightly closed by a lid 71, a liquid gasket and the like for preventing leakage of the lubricating oil. A lid 72 is arranged behind opening 111 of casing 104, and the space accommodating motor generator MG1 is tightly closed by an oil seal 81, a liquid gasket and the like for preventing leakage of the lubricating oil.

The shaft of rotor 32 of motor generator MG1 is rotatably carried by a ball bearing 78 held by lid 72 and a ball bearing 77 held by a partition 203. Rotor 32 has a hollow shaft, through which the shaft of damper 124 extends therethrough. Needle bearings 79 and 80 are arranged between the shaft of rotor 32 and the shaft of damper 124.

The shaft of rotor 37 of motor generator MG2 is rotatably carried by a ball bearing 73 held by lid 71 and a ball bearing 74 held by partition 202.

The ring gear casing that are provided at its inner periphery with the ring gear of reducer RD and the ring gear of power split device PSD are rotatably carried by a ball bearing 75 held by partition 202 and a ball bearing 76 held by partition 203.

The chamber accommodating power control unit 21 and the chamber accommodating motor generator MG2 are separated from each other by partition 202 of casing 102, but are partially connected via a through hole into which terminal base 116 is inserted. The bus bar of the stator coil of motor generator MG2 is connected to one side of terminal base 116, and the bus bar of inverter 14 is connected to the other side thereof. For allowing electrical connection of these bus bars, an electrically conductive member extends through terminal base 116. Thus, terminal base 116 is configured to pass the electricity without allowing passage of lubricating oil ingredients from the motor generator MG2 side.

Likewise, terminal base 118 connects the space accommodating the power control unit and the space accommodating motor generator MG1 together to pass the electricity without passing the lubricating oil ingredients.

Figure 10:
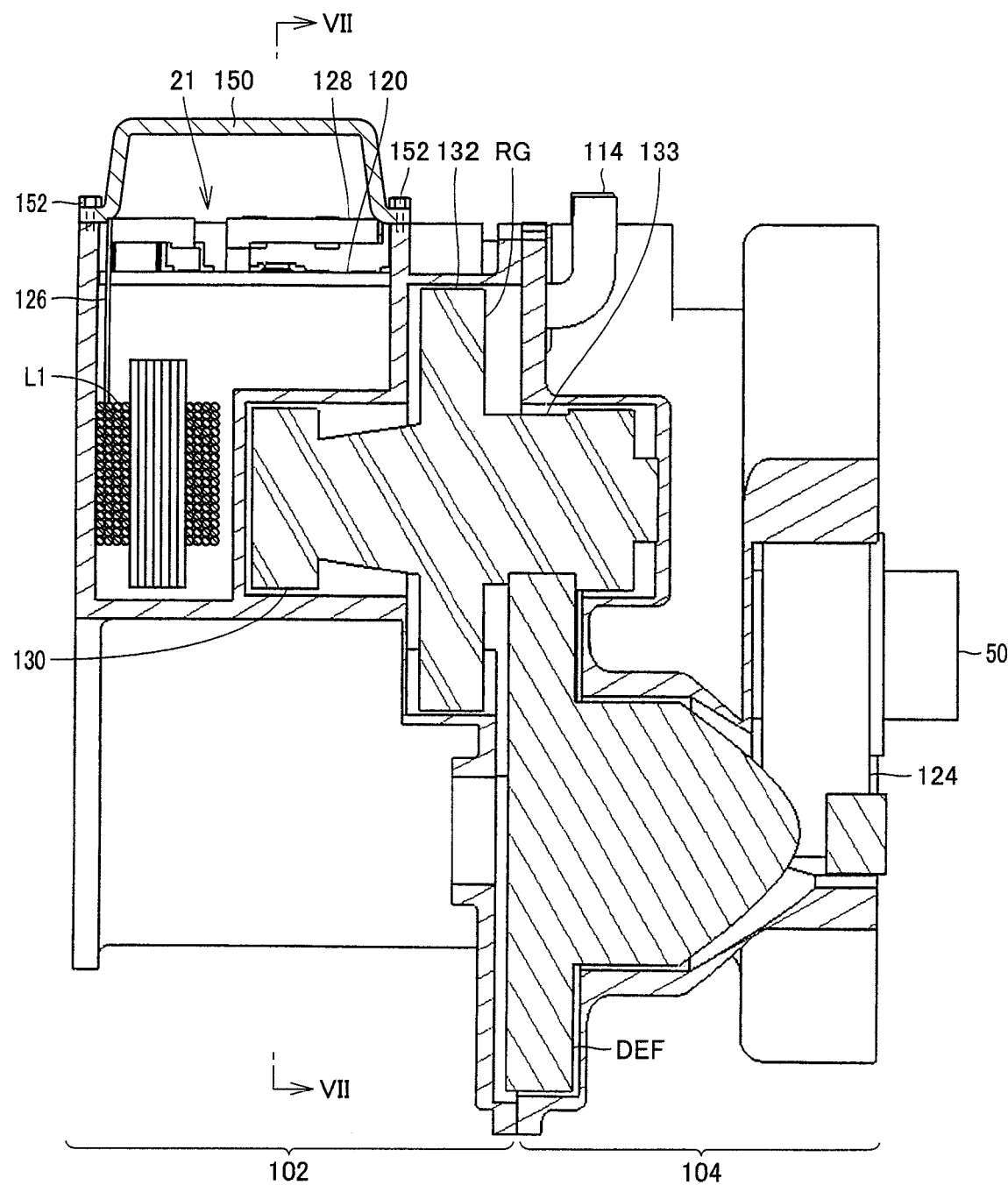
FIG. 10 is a cross section taken along line X-X in FIG. 4.

FIG. 10 is a cross section taken along line X-X in FIG. 4.

Referring to FIG. 10, a section of reactor L1 is shown in the accommodating chamber accommodating power control unit 21. Reactor L1 has a core formed of a stack of electromagnetic steel plates and a coil wound therearound.

Rotation shaft 130 of reduction gear RG shown in FIG. 7 is arranged near reactor L1, and a counter driven gear 132 of reduction gear RG is arranged in a central position. Counter driven gear 132 meshes with counter drive gear 70 in FIG. 2. A final drive gear 133 is arranged on the same shaft as counter driven gear 132, and differential gear DEF that is a final driven gear meshing with final drive gear 133 is shown under final drive gear 133.

Figure 11:
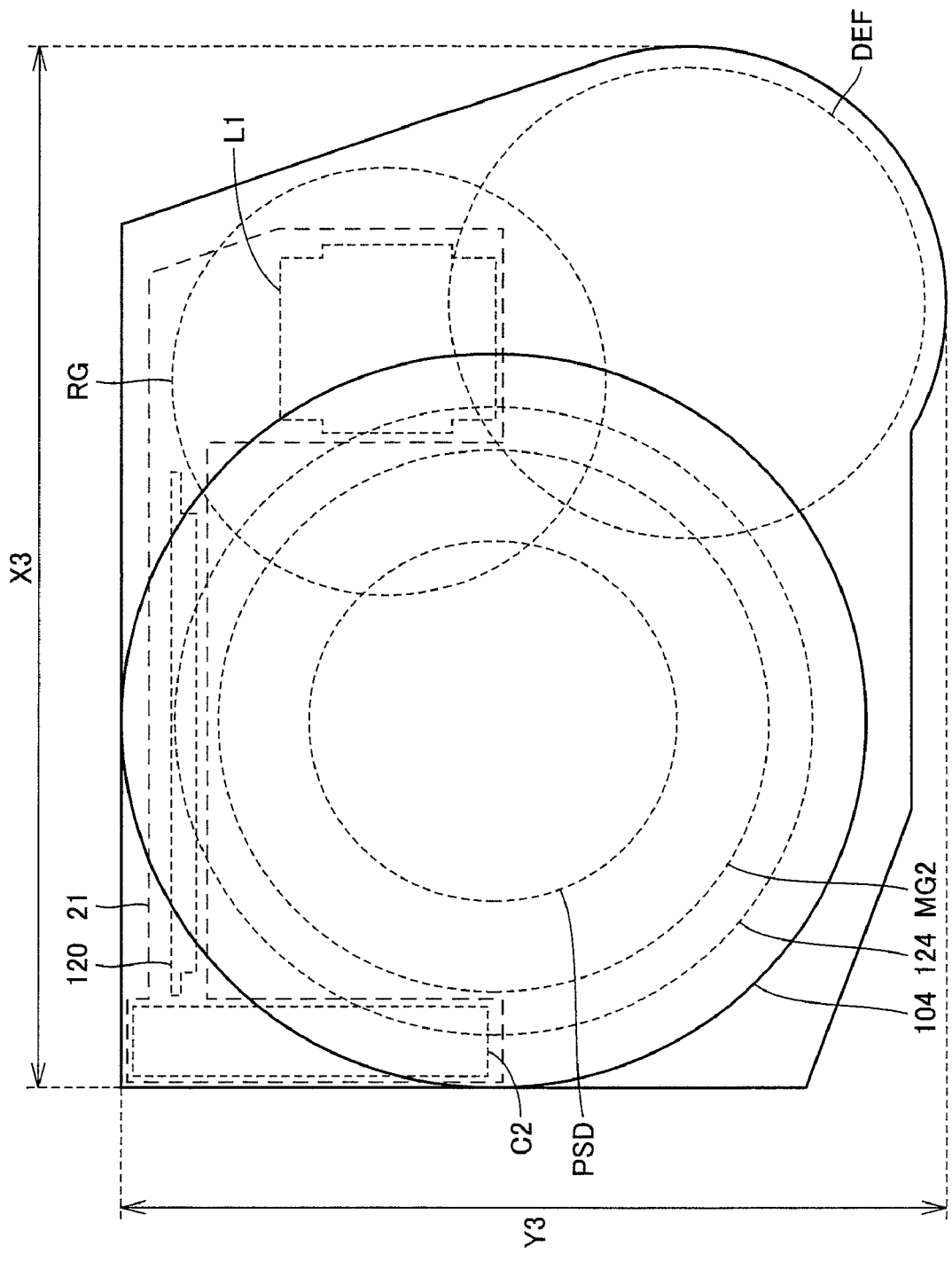
FIG. 11 is a view of the casing projected in a direction of a rotation axis and particularly shows a counter of the casing and parts accommodated therein.

FIG. 11 is a view of the casing projected in the direction of the rotation axis and particularly shows the counter of the casing and the parts accommodated therein.

FIG. 11 shows, inside the casing of the drive device of the vehicle, damper 124 coupled to the crank shaft of the internal combustion engine, motor generator MG2 that has the rotor coaxial with damper 124 and the stator arranged around the rotor, power split device PSD receiving the torques from damper 124 and motor generator MG2, reduction gear RG that has the rotation axis extending substantially parallel to the rotation axis of damper 124 and radially shifted therefrom, and receives the torque from power split device PSD, differential gear DEF that has a rotation axis extending substantially parallel to the rotation axis of damper 124 and radially shifted therefrom, and meshes with reduction gear RG for transmitting the torque to the wheels, board 120 controlling motor generator MG2, and power control unit 21 including reactor L1 and capacitance C2. The casing accommodates damper 124, motor generator MG2, reduction gear RG, differential gear DEF and power control unit 21.

In FIG. 11 that is a view of the casing projected in the direction of the rotation axis, the vehicle drive device in the vehicle-mounted state has a horizontal size of X3, which is determined between an outer edge of the casing portion accommodating differential gear DEF and an outer edge of casing 104 accommodating damper 124. Therefore, it can be understood that capacitor C2, board 120 and reactor L1 forming the power control unit are located within size X3.

In FIG. 11, the drive control device in the vehicle-mounted state has a vertical size or height of Y3. An outer edge of the casing portion accommodating differential gear DEF defines a lower end of size Y3. An outer edge of the casing portion accommodating damper 124 defines an upper end of size Y3.

Therefore, it can be understood that capacitor C2, board 120 and reactor L1 forming power control unit 21 is arranged within size Y3.

In the view of the casing projected in the direction of the rotation axis, the casing portion accommodating power control unit 21 in the vehicle-mounted state has a height not exceeding a height of the space of the remaining casing portion accommodating damper 124, motor generator MG2, reduction gear RG and differential gear DEF. The structure of the casing and the arrangement of power control unit 21 are determined to satisfy this relationship of the heights. Thereby, the vehicle can have a center of gravity in a low position, and can improve a drive stability.

Also, in connection with the horizontal direction in the vehicle-mounted state, the structure of the casing and the arrangement of power control unit 21 are determined such that the casing portion accommodating power control unit 21 is located inside the projected portion of the space of the other casing portion. Thereby, the vehicle drive device has a small contour.

Figure 12:
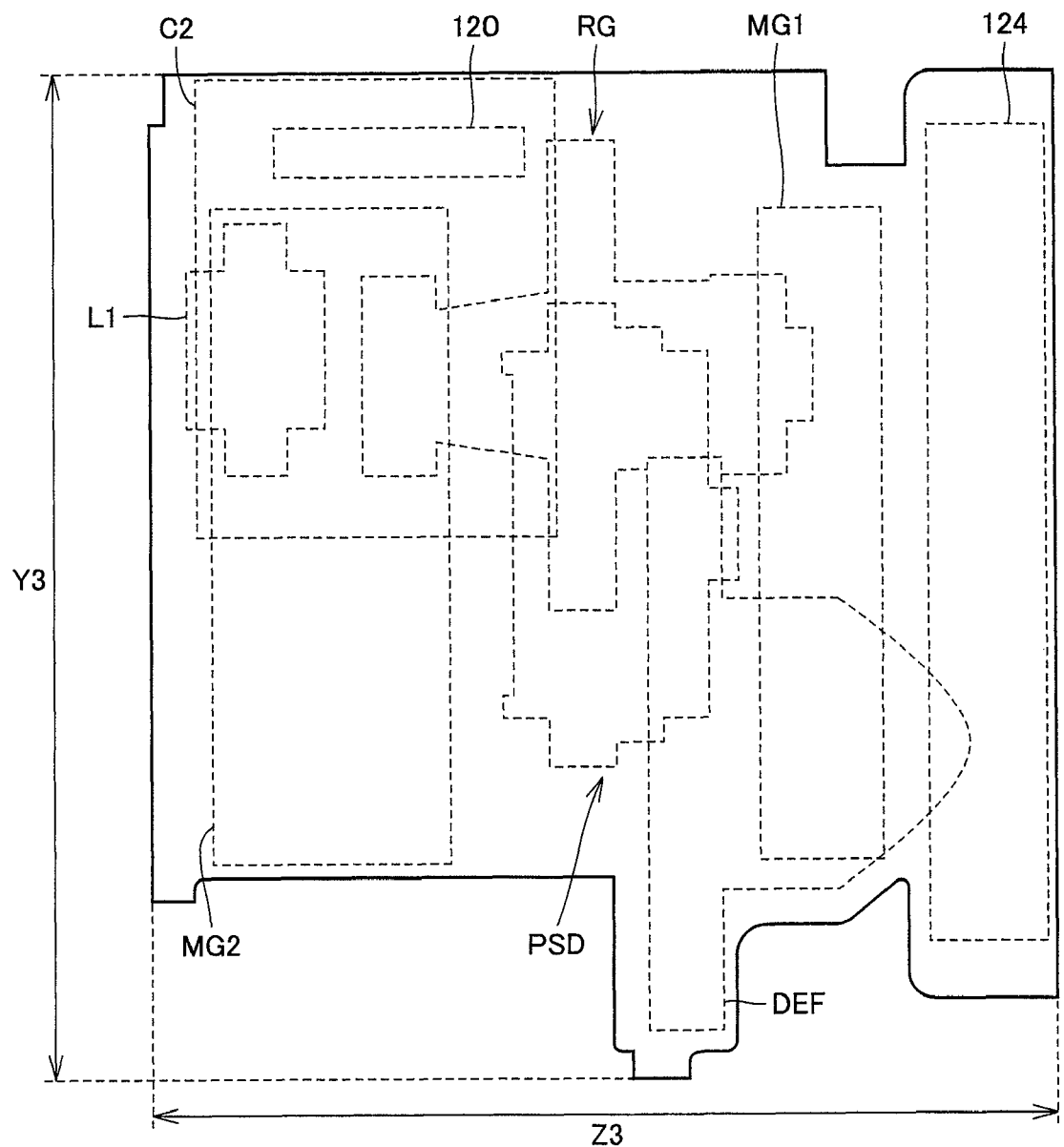
FIG. 12 is a view of the casing projected in a direction perpendicular to the rotation axis and perpendicular to a vertical direction, and particularly shows a counter of the casing and parts accommodated therein.

FIG. 12 is a view of the casing projected in a direction perpendicular to the rotation axis and perpendicular to a vertical direction, and particularly shows a counter of the casing and parts accommodated therein.

Referring to FIG. 12, size Z3 in the direction perpendicular to the vertical direction of the casing in the vehicle-mounted state is likewise defined between the outer edge of the lid of the casing portion accommodating motor generator MG2 and the outer edge of the casing portion accommodating damper 124, and it can be understood that capacitor C2, board 120 and reactor L1 forming the power control unit 21 arranged within a size Z3.

Thus, as already described with reference to FIG. 11, size Y3 in the vertical (i.e., height) direction is determined by the portion accommodating damper 124, motor generator MG2, reduction gear RG and differential gear DEF. In the view of the casing projected perpendicularly to the rotation axis and perpendicularly to the vertical direction in the vehicle-mounted state, the casing portion that accommodates power control unit 21 including board 120, reactor L1 and capacitor C2 is contained in the space of the remaining casing portion, i.e., the portion accommodating damper 124, motor generator MG2, reduction gear RG and differential gear DEF.

As described above, the components of the power control unit, i.e., power element board 120, reactor L1 and capacitor C2 are arranged using the space remaining around the structure in which where reduction gear RG and differential gear DEF are arranged in addition to motor generators MG1 and MG2, reducer RD and power split device PSD. Thereby, the drive device for the hybrid vehicle can have a small height and a compact structure.

As shown in FIG. 11, the spaces on the opposite sides of motor generator MG2 are used for arranging reactor L1 and capacitance C2, respectively, and the structure using the space on only one side is not employed. Thereby, a weight balance with respect to motor generator MG2 can be improved, and the required space can be further reduced.

Power split device PSD, reduction gear RG receiving the torque from power split device PSD and differential gear DEF meshing with reduction gear RG to transmit the torque to the wheels correspond, as a whole, to a "power transmitting mechanism" that combines the powers generated by motor generators MG1 and MG2 with the power generated by the engine, and transmits the combined powers to the drive shaft.

Each of reduction gear RG and differential gear DEF corresponds to the power transmission gear receiving the torque from power split device PSD. However, reduction gear RG and differential gear DEF are not essential, and the invention can be applied to vehicles that do not have reduction gear RG or that are of a rear drive vehicle having differential gear DEF not integrated with the drive device.

Further, the invention can be applied to a parallel hybrid using an electric motor for assisting driving when an engine is accelerating or the like, and to a structure in which only one motor is integrated in the drive device.

According to the embodiment of the invention, as described above, the casing of the drive device for the hybrid vehicle and particularly the casing integrated with the power control unit including the inverter has the motor generator accommodating portion and the power control unit (inverter) accommodating portion that are integrally formed so that the external leakage of electromagnetic noises from the drive device can be prevented.

According to the structure of the drive device described above, the hybrid vehicle including the drive device can keep the center of gravity in a low position, and the drive stability of the vehicle can be improved as compared with conventional structures. Further, a required space in an engine room can be reduced.

The power control unit portion including the inverter can be arranged to occupy a low and compact space by using the remaining spaces beside the transaxle, i.e., the spaces beside motor generator MG2 and the power split device. Thereby, the transaxle portion can have a form or contour close to that of a conventional gasoline-powered vehicle so that it is possible to achieve the drive device for the hybrid vehicle that can be mounted on more kinds of vehicles.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A drive device for a hybrid vehicle comprising:
a rotational electric machine;
a power transmitting mechanism combining a power generated by said rotational electric machine with a power generated by an internal combustion engine and providing the combined powers to a drive shaft;
a power control unit controlling said rotational electric machine;
a casing having a first accommodating portion employed for accommodating said power control unit, and a second accommodating unit employed for accommodating at
least said rotational electric machine and formed integrally with said first accommodating portion; and
a cover member fixed to said casing and covering an opening in said first accommodating portion,
wherein said power control unit is accommodated in a recess which forms said first accommodating portion and which is formed by a side wall surface of said casing.

2. The drive device for the hybrid vehicle according to claim 1, further comprising:
a damper coupled to a crankshaft of the internal combustion engine, wherein said rotational electric machine has a rotation axis matching with a rotation axis of said damper,
said second accommodating portion is configured to accommodate said rotational electric machine, said damper and said power transmitting mechanism, and
in a view obtained by projection of said drive device in a direction perpendicular to a direction of said rotation axis and perpendicular to a vertical direction when said drive device is oriented as mounted in a vehicle, said first accommodating portion is arranged such that said power control unit is located within a vertical dimension of said second accommodating portion.

3. The drive device for the hybrid vehicle according to claim 1, wherein
said power control unit further includes a circuit board carrying a power element of an inverter corresponding to said rotational electric machine, and arranged above said rotational electric machine in a vehicle-mounted state.

4. A drive device for a hybrid vehicle, comprising:
a rotational electric machine;
a power transmitting mechanism combining a power generated by said rotational electric machine with a power generated by an internal combustion engine and providing the combined powers to a drive shaft;
a power control unit controlling said rotational electric machine;
a casing having a first accommodating portion employed for accommodating said power control unit, and a second accommodating unit employed for accommodating at
least said rotational electric machine and formed integrally with said first accommodating portion,
wherein said power control unit includes an inverter arranged corresponding to said rotational electric machine, and a voltage converter configured to generate an input voltage of said inverter; and
wherein said voltage converter includes:
a reactor arranged on one side of said rotation axis of said rotational electric machine, and
a capacitor arranged on the other side of said rotation axis of said rotational electric machine.

5. The drive device for the hybrid vehicle according to claim 4, wherein
said power control unit further includes a circuit board having at least a portion arranged in a region between said reactor and said capacitor, and carrying a power element of said inverter and said voltage converter.

6. The drive device for the hybrid vehicle according to claim 1, further comprising:
a damper coupled to a crankshaft of said internal combustion engine wherein said rotational electric machine has a rotation axis matching with a rotation axis of said damper, and
in a view obtained by projection in a direction of said rotation axis, said power control unit is arranged in said casing such that said power control unit is located within a horizontal dimension of a portion of said casing accommodating said damper, said rotational electric machine and said power transmitting mechanism when said casing is oriented as mounted in a vehicle.

7. The drive device for the hybrid vehicle according to claim 1, further comprising:
a damper coupled to a crankshaft of said internal combustion engine, wherein said rotational electric machine has a rotation axis matching with a rotation axis of said damper, and
in a view obtained by projection in a direction of said rotation axis, said power control unit is arranged in said casing such that said power control unit is located within a vertical dimension of a portion of said casing accommodating said damper, said rotational electric machine and said power transmitting mechanism when said casing is oriented as mounted in a vehicle.

* * * * *